United States Patent
Peng et al.

(10) Patent No.: US 10,424,200 B2
(45) Date of Patent: Sep. 24, 2019

(54) VEHICLE AND VEHICLE SPEED CONTROLLING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Chun-Kai Peng, New Taipei (TW); Wei Wu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 176 days.

(21) Appl. No.: 15/663,800

(22) Filed: Jul. 30, 2017

(65) Prior Publication Data
US 2018/0040243 A1 Feb. 8, 2018

(30) Foreign Application Priority Data
Aug. 4, 2016 (CN) .......................... 2016 1 0633061

(51) Int. Cl.
| | |
|---|---|
| G08G 1/0967 | (2006.01) |
| F02D 41/26 | (2006.01) |
| F02D 41/12 | (2006.01) |
| F02D 41/30 | (2006.01) |
| G08G 1/0962 | (2006.01) |
| F02D 41/34 | (2006.01) |
| F02D 31/00 | (2006.01) |

(52) U.S. Cl.
CPC ..... *G08G 1/096725* (2013.01); *F02D 41/123* (2013.01); *F02D 41/26* (2013.01); *F02D 41/3005* (2013.01); *G08G 1/0967* (2013.01); *G08G 1/09626* (2013.01); *G08G 1/096716* (2013.01); *B60Y 2300/143* (2013.01); *B60Y 2300/432* (2013.01); *B60Y 2400/301* (2013.01); *B60Y 2400/303* (2013.01); *B60Y 2400/90* (2013.01); *F02D 31/009* (2013.01); *F02D 41/34* (2013.01); *F02D 2200/501* (2013.01); *F02D 2200/701* (2013.01); *F02D 2200/702* (2013.01)

(58) Field of Classification Search
CPC .......... G08G 1/096725; G08G 1/09626; F02D 41/123; F02D 41/26; B60Y 2300/143; B60Y 2300/432
USPC .......................................................... 701/93
See application file for complete search history.

(56) References Cited

U.S. PATENT DOCUMENTS

| | | | | | |
|---|---|---|---|---|---|
| 7,739,036 | B2 * | 6/2010 | Grimm | ............ | G08G 1/096716 340/905 |
| 8,751,133 | B2 * | 6/2014 | Poulin | ................. | B60W 30/146 700/304 |
| 8,896,464 | B2 * | 11/2014 | Khachaturian | .... | G01C 21/3697 340/905 |
| 2004/0107037 | A1 * | 6/2004 | Straub | ................ | B60K 31/0058 701/93 |

(Continued)

*Primary Examiner* — Tan Q Nguyen
(74) *Attorney, Agent, or Firm* — ScienBiziP, P.C.

(57) ABSTRACT

A speed controlling method for a vehicle comprises obtaining a driving speed limit of a road ahead from a navigation system of the vehicle. A current driving speed of the vehicle is detected and if the current driving speed of the vehicle is greater than the limit ahead, a driver of the vehicle is informed that he must slow down in a distance between the vehicle and a speed measuring device located on the road ahead.

15 Claims, 3 Drawing Sheets

(56) References Cited

U.S. PATENT DOCUMENTS

| | | | |
|---|---|---|---|
| 2007/0143499 A1* | 6/2007 | Chang | G06Q 10/10 |
| | | | 709/245 |
| 2010/0036594 A1* | 2/2010 | Yamane | G08G 1/0104 |
| | | | 701/117 |
| 2012/0140075 A1* | 6/2012 | Cunningham | G08G 1/096 |
| | | | 348/148 |
| 2013/0245945 A1* | 9/2013 | Morita | G08G 1/096716 |
| | | | 701/533 |
| 2014/0088798 A1* | 3/2014 | Himmelstein | G06Q 10/10 |
| | | | 701/2 |

* cited by examiner

VEHICLE AND VEHICLE SPEED CONTROLLING METHOD

CROSS-REFERENCE TO RELATED APPLICATIONS

This application claims priority to Chinese Patent Application No. 201610633061.0 filed on Aug. 4, 2016, the contents of which are incorporated by reference herein.

FIELD

The subject matter herein generally relates to traffic safety controlling technology, and particularly to a vehicle and a method for controlling a driving speed of the vehicle.

BACKGROUND

Traffic accidents are common, and how to reduce traffic accidents is a problem.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
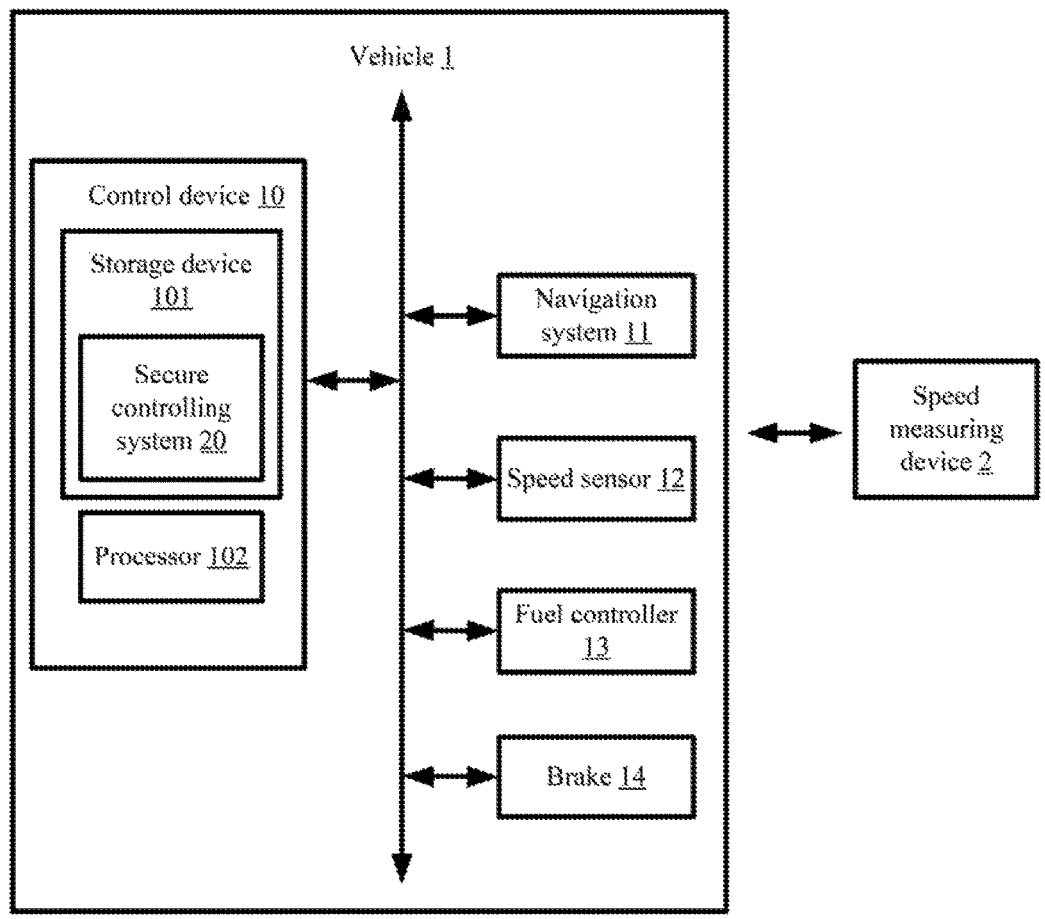
FIG. 1 is a block diagram of one exemplary embodiment of a vehicle including a secure controlling system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of a portion of a control system (#) of a vehicle. Depending on the embodiment, the control system (#) of the vehicle 1 can include, but is not limited to, a control device 10, a navigation system 11, a speed sensor 12, a fuel controller 13, and a brake 14. In at least one exemplary embodiment, the vehicle 1 can be a truck or a bus, a railed vehicle such as a train or a tram, or a watercraft.

The control device 10 can be an electronic control unit (ECU), i.e., a computer of the vehicle ("vehicle PC"). The control device 10 can include a storage device 101 and at least one processor 102. The storage device 101 can be internally or externally located in the control device 10. For example, the storage device 101 can be a secure digital card, or a smart media card. The storage device 101 can be used to store data of the vehicle 1 such as speeds and distances. The at least one processor 102 can be a central processing unit (CPU), a microprocessor, or other data processor chip that performs functions of the vehicle 1.

The navigation system 11 can be a global positioning system (GPS) navigation system. The navigation system 11 can locate a current position of the vehicle 1 and display the current position on a display screen (not indicated in FIG. 1) of the control device 10. When a driver of the vehicle 1 enters a desired destination point using the control device 10, the navigation system 11 can calculate a driving route according to the destination and the current position of the vehicle 1.

In at least one exemplary embodiment, the navigation system 11 pre-stores positions of a number of speed measuring devices (for example, speed measuring radars) which are known or are likely to be in position on certain roads, and pre-stores driving speed limits of each section of the certain roads. Each speed measuring device is located at predetermined positions of certain roads and configured for measuring driving speeds of vehicles.

In at least one exemplary embodiment, the navigation system 11 can calculate a distance between the vehicle 1 and the speed measuring device using the position of the vehicle 1 and the position of the speed measuring device. For example, as shown in FIG. 1, the navigation system 11 can calculate a distance between the vehicle 1 and a speed measuring device 2. The speed measuring device 2 is located on a road ahead of the vehicle 1.

The speed sensor 12 can detect a driving speed of the vehicle 1, and can send the driving speed to the control device 10. In at least one exemplary embodiment, the speed sensor 12 can be a magnetoelectric speed sensor, a Hall speed sensor, a photoelectric speed sensor, or a wheel speed sensor.

The fuel controller 13 can open and close an fuel-line of the vehicle 1, and can control fuel volume supplied to the fuel-line. In at least one exemplary embodiment, the fuel controller 13 can be electrically connected with the control device 10, and the control device 10 can control the fuel controller 13 by sending control signals to the fuel controller 13.

The brake 14 can slow or stop the vehicle 1.

In at least one exemplary embodiment, the control device 10 can obtain the current driving speed of the vehicle 1 from the speed sensor 12. The control device 10 can further obtain a distance between the current position of the vehicle 1 and a position of a speed measuring device (for example, the speed measuring device 2) located on a certain road ahead of the vehicle 1. The road ahead of the vehicle 1 can be defined as a section of the road that is located nearest to and ahead of the current position of the vehicle 1. When the current driving speed of the vehicle 1 is greater than the driving speed limit, the control device 10 can control the fuel controller 13 to control the fuel volume of the vehicle 1 or close the fuel-line of the vehicle 1, such that the driving speed of the vehicle 1 can be slowed down within a given time or distance.

In at least one exemplary embodiment, the control device 10 includes a secure controlling system 20 which is installed in the storage device 101, and can be executed by the at least one processor 102. The secure controlling system 20 obtain the driving speed limit of the road ahead and the current speed of the vehicle 1 to determine whether the driving speed of the vehicle 1 should be slowed. When the driving speed of the vehicle 1 requires to be slowed, the secure controlling system 20 can slow the driving speed of the vehicle 1 by controlling the fuel controller 13 or requiring or reminding the driver of the vehicle 1 to operate the brake 14.

Figure 2:
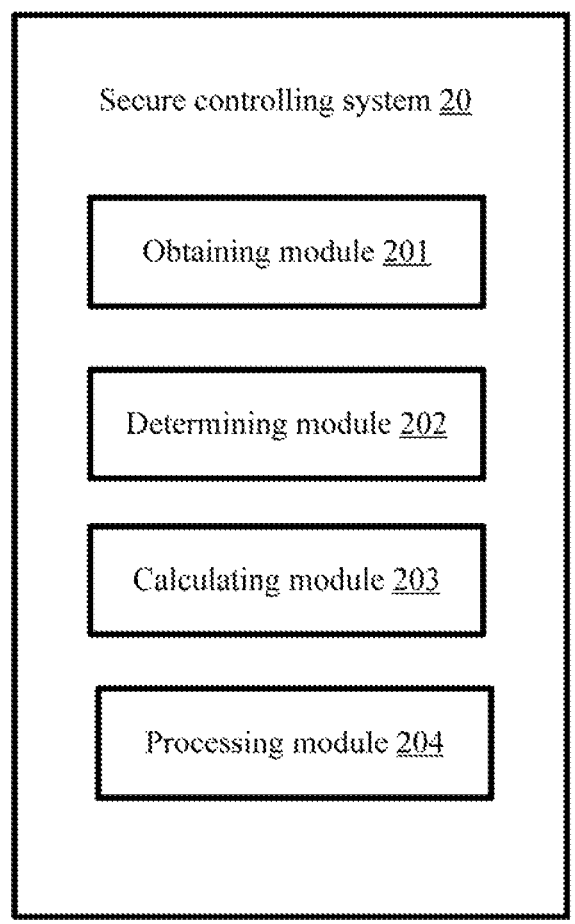
FIG. 2 is a block diagram of one exemplary embodiment of modules of the secure controlling system of FIG. 1.

FIG. 2 illustrates a block diagram of one exemplary embodiment of modules of the secure controlling system 20. In at least one exemplary embodiment, the secure controlling system 20 can include an obtaining module 201, a determining module 202, a calculating module 203, and a processing module 204. The modules 201-203 include computerized codes in the form of one or more programs that may be stored in the storage device 101. The computerized codes include instructions that can be executed by the at least one processor 102.

The obtaining module 201 can obtain a driving speed limit of a road ahead of the vehicle 1 from the navigation system 11.

In at least one exemplary embodiment, the navigation system 11 can periodically detect road conditions. For example, the navigation system 11 can detect the road conditions every five seconds. In at least one exemplary embodiment, the road conditions of the road can include, but are not limited to, traffic blocks, road-building, a number of traffic lights, weather conditions, or the like. The navigation system 11 pre-stores the driving speed limit of the road ahead of the vehicle 1, and pre-stores a position of the speed measuring device 2 that is located on the road ahead of the vehicle 1. The speed measuring device 2 measures the driving speed of the vehicle 1 when the vehicle 1 drives into the road ahead. The navigation system 11 can calculate a distance between the vehicle 1 and the speed measuring device 2 using the position of the vehicle 1 and the position of the speed measuring device 2.

In a very basic embodiment, a driver can be given a warning to slow down to a certain speed within the distance between current location and the speed measuring device.

The obtaining module 201 can obtain a current driving speed of the vehicle 1 from the speed sensor 12. The obtaining module 201 can further obtain a current position of the vehicle 1 and the position of the speed measuring device 2 from the navigation system 11. The obtaining module 201 can calculate a distance between the vehicle 1 and the speed measuring device 2 using the current position of the vehicle 1 and the position of the speed measuring device 2 obtained from the navigation system 11.

In other exemplary embodiments, the obtaining module 201 can further obtain the distance between the vehicle 1 and the speed measuring device 2 from the navigation system 11.

The determining module 202 can determine whether the current driving speed of the vehicle 1 is less than or equal to the driving speed limit. When the current driving speed of the vehicle 1 is less than or equal to the driving speed limit, the determining module 202 can determine that the vehicle 1 can safely drive on the road ahead. When the current driving speed of the vehicle 1 is greater than the driving speed limit, the determining module 202 can determine that the vehicle 1 is travelling too fast, and that the vehicle 1 should be slowed down to avoid breaking the law.

The calculating module 203 can calculate a time duration required by the vehicle 1 for slowing down, using the current driving speed of the vehicle 1 and the distance between the vehicle 1 and the speed measuring device 2. In at least one exemplary embodiment, the time duration is calculated by dividing by the current driving speed of the vehicle 1 by the distance.

For example, if the current driving speed of the vehicle 1 is twenty kilometers per hour, and the distance between the vehicle 1 and the speed measuring device 2 is two kilometers, then the time duration equals six minutes.

The processing module 204 can control the vehicle 1 to slow down based on the calculated time duration.

In at least one exemplary embodiment, the processing module 204 can control the vehicle 1 to slow down by controlling the fuel controller 13 to reduce the fuel volume or close the fuel-line of the vehicle 1. In at least one exemplary embodiment, when the calculated time duration is less than a preset time duration (e.g., ten minutes), the processing module 204 can directly close the fuel-line of the vehicle 1. When the calculated time duration is greater than or equal to the pre-set time duration, the processing module 204 can firstly reduce a half of the fuel volume of the vehicle 1, and then when a remaining time duration is less than the pre-set time duration, the processing module 204 can directly close off the fuel-line of the vehicle 1. The processing module 204 can calculate the remaining time duration by counting down from the calculated time duration.

In other exemplary embodiments, the processing module 204 can prompt the driver of the vehicle 1 to operate the brake 14 to slow down in the calculated time duration.

For example, when the calculated time duration equals six minutes, the processing module 204 can display a message indicating the driving speed limit ahead and the calculated time duration on a screen of the control device 10, and remind the driver to operate the brake 14 to enable the vehicle 1 to slow down in six minutes. For another example, the processing module 204 can broadcast content of the message vocally.

Figure 3:
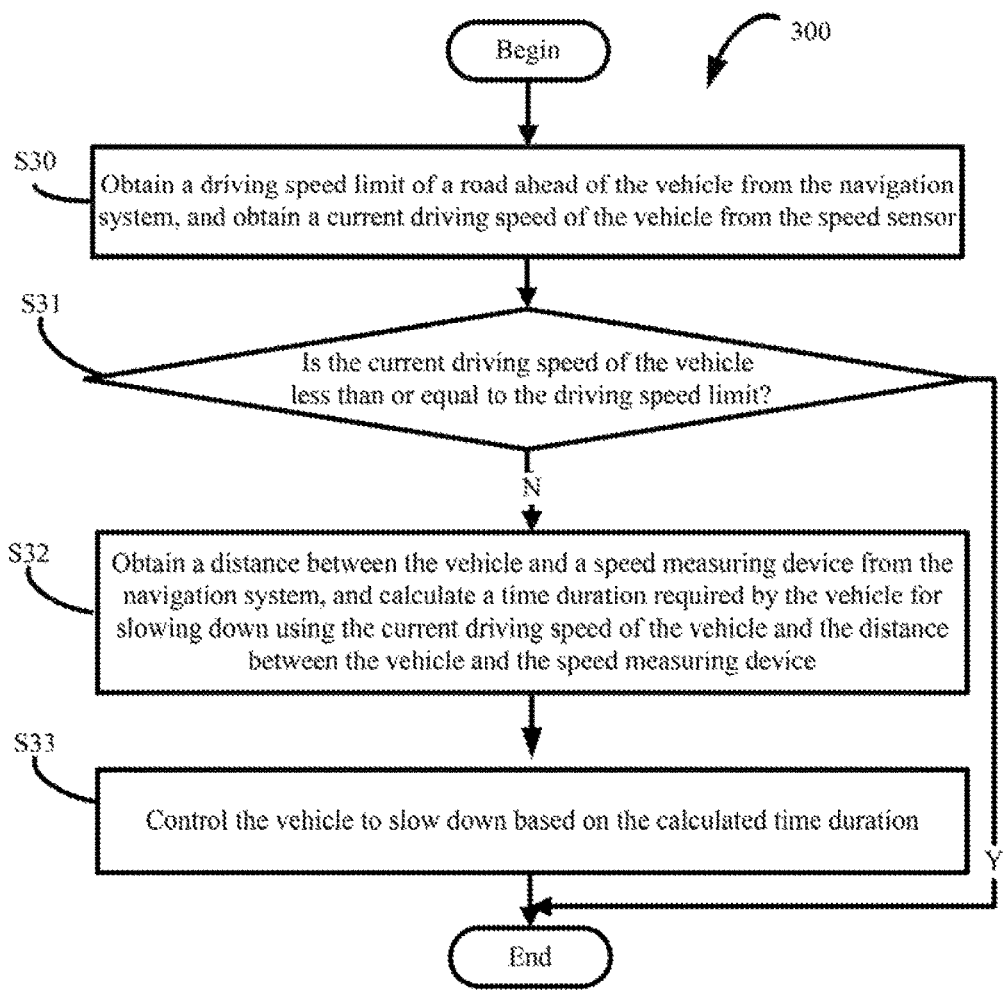
FIG. 3 illustrate a flow chart of one exemplary embodiment of a method of controlling a vehicle.

FIG. 3 illustrates a flowchart which is presented in accordance with an example embodiment. The exemplary method 300 is provided by way of example, as there are a variety of ways to carry out the method. The method 300 described below can be carried out using the configurations illustrated in FIG. 1, for example, and various elements of these figures are referenced in explaining exemplary method 300. Each block shown in FIG. 3 represents one or more processes, methods, or subroutines, carried out in the exemplary method 300. Additionally, the illustrated order of blocks is by example only and the order of the blocks can be changed according to the present disclosure. The exemplary method 300 can begin at block S30. Depending on the embodiment, additional steps can be added, others removed, and the ordering of the steps can be changed.

At block S30, the obtaining module 201 can obtain a driving speed limit of a road ahead of the vehicle 1 from the navigation system 11. The obtaining module 201 can also obtain a current driving speed of the vehicle 1 from the speed sensor 12.

At block S31, the determining module 202 can determine whether the current driving speed of the vehicle 1 is less than or equal to the driving speed limit. When the current driving speed of the vehicle 1 is less than or equal to the driving speed limit, the determining module 202 can determine that the vehicle 1 can safely drive on the road ahead, and the process ends. When the current driving speed of the vehicle 1 is greater than the driving speed limit, the determining module 202 can determine that the vehicle 1 is over the driving speed limit, and the vehicle 1 should be slowed down to avoid punishment such as penalty from traffic authorities, the process goes to block S32.

At block S32, the obtaining module 201 can obtain a current position of the vehicle 1 and the position of the speed measuring device 2 from the navigation system 11. The obtaining module 201 can calculate a distance between the vehicle 1 and the speed measuring device 2 using the current position of the vehicle 1 and the position of the speed measuring device 2 obtained from the navigation system 11.

In other exemplary embodiments, the obtaining module 201 can directly obtain the distance between the vehicle 1 and the speed measuring device 2 from the navigation system 11.

The calculating module 203 can calculate a time duration required by the vehicle 1 for slowing down using the current driving speed of the vehicle 1 and the distance between the vehicle 1 and the speed measuring device 2.

In at least one exemplary embodiments, the time duration is calculated by dividing by the current driving speed of the vehicle 1 by the distance.

For example, if the current driving speed of the vehicle 1 is twenty kilometers per hour, and the distance between the vehicle 1 and the speed measuring device 2 is two kilometers, then the time duration equals six minutes.

At block S33, the processing module 204 can control the vehicle 1 to slow down based on the calculated time duration.

In at least one exemplary embodiment, the processing module 204 can control the vehicle 1 to slow down by controlling the fuel controller 13 to reduce the fuel volume supplied to the fuel-line or close the fuel-line of the vehicle 1. In at least one exemplary embodiment, when the calculated time duration is less than a preset time duration (e.g., ten minutes), the processing module 204 can directly close the fuel-line of the vehicle 1. When the calculated time duration is greater than or equal to the pre-set time duration, the processing module 204 can firstly reduce a half of the fuel volume of the vehicle 1, and then when a remaining time duration is less than the pre-set time duration, the processing module 204 can directly close off the fuel-line of the vehicle 1. The processing module 204 can calculate the remaining time duration by counting down from the calculated time duration.

In other exemplary embodiments, the processing module 204 can prompt the driver of the vehicle 1 to operate the brake 14 to enable the vehicle 1 to slow down in the calculated time duration.

For example, when the calculated time duration equals six minutes, the processing module 204 can display a message indicating the driving speed limit and the calculated time duration on a screen of the control device 10, and remind the driver to operate the brake 14 to enable the vehicle 1 to slow down in six minutes. For another example, the processing module 204 can broadcast content of the message using voice.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A secure controlling method applied to a vehicle, comprising:
    obtaining a driving speed limit of a road ahead from a navigation system of the vehicle;
    detecting a current driving speed of the vehicle using a speed sensor of the vehicle;
    determining whether the current driving speed of the vehicle is greater than the driving speed limit;
    when the current driving speed of the vehicle is greater than the driving speed limit, calculating a time duration based on the current driving speed of the vehicle and a distance between the vehicle and a speed measuring device on the road ahead; and
    controlling the vehicle to slow down according to the calculated time duration.

2. The secure controlling method according to claim 1, wherein the distance between the vehicle and the speed measuring device is obtained from the navigation system; or
    the distance is calculated by the vehicle using a current position of the vehicle and a position of the speed measuring device that are obtained from the navigation system.

3. The secure controlling method according to claim 1, wherein the controlling of the vehicle comprises:
    controlling a fuel controller of the vehicle to reduce fuel volume supplied to a fuel-line of the vehicle or closing the fuel-line.

4. The secure controlling method according to claim 3, wherein the controlling of the vehicle comprises:
    directly closing the fuel-line of the vehicle when the calculated time duration is less than a preset time duration.

5. The secure controlling method according to claim 4, wherein the controlling of the vehicle comprises:
    firstly reducing a half of the fuel volume supplied to the fuel-line when the calculated time duration is greater than or equal to the pre-set time duration; and
    completely closing the fuel-line of the vehicle when a remaining time duration is less than the pre-set time duration, wherein the remaining time duration is calculated by counting down from the calculated time duration.

6. A vehicle comprising:
    a storage device;
    at least one processor; and
    the storage device storing one or more programs, which when executed by the at least one processor, cause the at least one processor to:
    obtain a driving speed limit of a road ahead from a navigation system of the vehicle;
    detect a current driving speed of the vehicle using a speed sensor of the vehicle;

determine whether the current driving speed of the vehicle is greater than the driving speed limit;

when the current driving speed of the vehicle is greater than the driving speed limit, calculate a time duration based on the current driving speed of the vehicle and a distance between the vehicle and a speed measuring device on the road ahead; and control the vehicle to slow down according to the calculated time duration.

7. The vehicle according to claim 6, wherein the distance between the vehicle and the speed measuring device is obtained from the navigation system; or the distance is calculated by the vehicle using a current position of the vehicle and a position of the speed measuring device that are obtained from the navigation system.

8. The vehicle according to claim 6, wherein the controlling of the vehicle comprises:

controlling a fuel controller of the vehicle to reduce fuel volume supplied to a fuel-line of the vehicle or closing the fuel-line.

9. The vehicle according to claim 8, wherein the controlling of the vehicle comprises:

directly closing the fuel-line of the vehicle when the calculated time duration is less than a preset time duration.

10. The vehicle according to claim 9, wherein the controlling of the vehicle comprises:

firstly reducing a half of the fuel volume supplied to the fuel-line when the calculated time duration is greater than or equal to the pre-set time duration; and completely closing the fuel-line of the vehicle when a remaining time duration is less than the pre-set time duration, wherein the remaining time duration is calculated by counting down from the calculated time duration.

11. A non-transitory storage medium having stored thereon instructions that, when executed by a processor of a vehicle, causes the processor to perform a secure controlling method, wherein the method comprises:

obtaining a driving speed limit of a road ahead from a navigation system of the vehicle;

detecting a current driving speed of the vehicle using a speed sensor of the vehicle;

determining whether the current driving speed of the vehicle is greater than the driving speed limit;

when the current driving speed of the vehicle is greater than the driving speed limit, calculating a time duration based on the current driving speed of the vehicle and a distance between the vehicle and a speed measuring device on the road ahead; and controlling the vehicle to slow down according to the calculated time duration.

12. The non-transitory storage medium according to claim 11, wherein the distance between the vehicle and the speed measuring device is obtained from the navigation system; or the distance is calculated by the vehicle using a current position of the vehicle and a position of the speed measuring device that are obtained from the navigation system.

13. The non-transitory storage medium according to claim 11, wherein the controlling of the vehicle comprises:

controlling a fuel controller of the vehicle to reduce fuel volume supplied to an fuel-line of the vehicle or closing the fuel-line.

14. The non-transitory storage medium according to claim 13, wherein the controlling of the vehicle comprises:

directly closing the fuel-line of the vehicle when the calculated time duration is less than a preset time duration.

15. The non-transitory storage medium according to claim 14, wherein the controlling of the vehicle comprises:

firstly reducing a half of the fuel volume supplied to the fuel-line when the calculated time duration is greater than or equal to the pre-set time duration; and completely closing the fuel-line of the vehicle when a remaining time duration is less than the pre-set time duration, wherein the remaining time duration is calculated by counting down from the calculated time duration.

* * * * *